US012650520B2

(12) United States Patent
Dhaliwal et al.

(10) Patent No.: US 12,650,520 B2
(45) Date of Patent: Jun. 9, 2026

(54) DETECTING JAMMING IN OSNET USING MACHINE LEARNING

(71) Applicant: Ordnance Survey Limited, Southampton (GB)

(72) Inventors: Arjan Singh Kameron Dhaliwal, Berkshire (GB); Joshua Edward Pooley, Winchester (GB); Freja Katharine Hunt, Southampton (GB); Charles Robert Campbell Draper, Bristol (GB); Kate Emily New, Romsey (GB); Jacob Rainbow, Southampton (GB)

(73) Assignee: Ordnance Survey Limited, London (GB)

( * ) Notice: Subject to any disclaimer, the term of this patent is extended or adjusted under 35 U.S.C. 154(b) by 292 days.

(21) Appl. No.: 18/230,214

(22) Filed: Aug. 4, 2023

(65) Prior Publication Data

US 2024/0045075 A1 Feb. 8, 2024

(30) Foreign Application Priority Data

Aug. 5, 2022 (GB) ..................................... 2211451

(51) Int. Cl.
*G01S 19/21* (2010.01)
*G06N 20/20* (2019.01)

(52) U.S. Cl.
CPC .............. *G01S 19/21* (2013.01); *G06N 20/20* (2019.01)

(58) Field of Classification Search
None
See application file for complete search history.

(56) References Cited

U.S. PATENT DOCUMENTS

2009/0104869 A1 4/2009 Li
2015/0264239 A1 9/2015 Petersen et al.
(Continued)

FOREIGN PATENT DOCUMENTS

CN 105911566 A 8/2016
CN 109061577 A 12/2018
(Continued)

OTHER PUBLICATIONS

CN1113990002 Translation (Year: 2020).*
(Continued)

*Primary Examiner* — Whitney Moore
(74) *Attorney, Agent, or Firm* — Banner & Witcoff, Ltd.

(57) ABSTRACT

The present disclosure relates to an automatic interference/jamming detection system for use with a GNSS receiver or a GNSS receiver and off-the-shelf jamming detector. The automatic jamming detection system utilizes one of the following two techniques: using a jamming detector in conjunction with a GNSS receiver in order to analyze received data for key data indicators for suspicious interference/jamming activities such as signal-to-noise ratio, phase or maximum power, or using a trained jamming detection algorithm to convert received/stored GNSS data into spectrograms to visually highlight anomalies or potential interference/jamming events and then further using the Box-Cox transform to train the algorithm in order to transform data into a normal distribution for comparison against user tunable thresholds to further highlight potential interference/jamming events.

18 Claims, 16 Drawing Sheets

(56) References Cited

U.S. PATENT DOCUMENTS

| 2017/0111069 A1* | 4/2017 | Dafesh | H04B 1/1027 |
| 2017/0261615 A1 | 9/2017 | Ying et al. | |
| 2020/0410374 A1* | 12/2020 | White | G16H 40/67 |
| 2021/0334626 A1 | 10/2021 | Hang et al. | |

FOREIGN PATENT DOCUMENTS

| CN | 111366950 A | 7/2020 |
| CN | 111399002 A | 7/2020 |
| GB | 2530272 A | 3/2016 |
| KR | 20200047086 A | 5/2020 |

OTHER PUBLICATIONS

Search Report for GB2211451.6 dated Feb. 7, 2023, 6 pages.
Osborne, Jason, "Improving Your Data Transformations: Applying the Box-Cox Transformation," Practical Assessment, Research, and Evaluation, vol. 15, No. 12, Oct. 2010, 10 pages.
Morales-Ferre, Ruben et al., "A Survey on Coping With Intentional Interference in Satellite Navigation for Manned and Unmanned Aircraft," IEEE Communications Surveys & Tutorials, vol. 22, No. 1, Oct. 23, 2019, pp. 249-291.
Zuo, Shenzheng et al., "Detection of GPS Spoofing Attacks Based on Isolation Forest," 2021 IEEE 9th International Conference on Information, Communication and Networks, Nov. 25, 2021, pp. 357-361.

* cited by examiner

100

DETECTING JAMMING IN OSNET USING MACHINE LEARNING

CROSS REFERENCE TO RELATED APPLICATIONS

This Application claims priority to GB Application 2211451.6, filed Aug. 5, 2022, herein incorporated by reference in its entirety for all purposes.

TECHNICAL FIELD

The present disclosure generally relates to the detection of events that cause interference with or jamming of Global Navigation Satellite Systems (GNSS) signals. The present disclosure can be applied to GNSS receiver systems, to automatically detect interference/jamming signals on GNSS receiver data to highlight when suspicious activity is occurring or has occurred.

BACKGROUND AND RELATED ART

GNSS signals occupy a specific range of the electromagnetic (EM) spectrum, which is split into differing frequency bands. GNSS signals are transmitted from orbiting satellites to on-the-ground receivers in order to monitor position and timing. The intensity of these signals is typically low in the noise floor and can be overwhelmed by broadcasting within the same frequency band. Interference of this kind can be used to mask nefarious activities such as illegal trafficking. Its detection can therefore be used to improve detection of performance issues and support assessment of safety for those who use GNSS receivers.

In the past, these events have been monitored by manually sifting through the application of simple spectral masks to the output files of GNSS receivers, or by checking the spectral signature for interference or jamming. This is a labor-intensive process and likely results in an underestimation of jamming activity.

In addition, within the United Kingdom the present applicant operates a network of precisely surveyed GNSS receivers. The locations of the GNSS receivers are precisely surveyed and known to a high degree of accuracy. This allows comparison with the respective locations computed at each receiver via received GNSS signals, and hence gives an accurate indication of the error or degradation that is presently being experienced with PNT (positioning, navigation and timing) data derived from GNSS signals. The error or other degradations can then be compensated, for example by using real-time kinematic (RTK) techniques. The network of precisely surveyed receivers and the PNT correction services associated therewith are known in the art and available from the present applicant under the trade name "OS Net", and hence reference herein or elsewhere to OS Net refers to this network of precisely located GNSS receivers and supporting infrastructure, and the PNT correction services available therefrom.

SUMMARY

The present disclosure describes an automatic jamming detection system which uses data from a network of GNSS receivers whose locations are known to monitor, either historically or in real-time, any suspicious activities that could highlight interference/jamming that occur within GNSS signal bands, such as for example the L1, L2, L5 and E6 GNSS bands.

The detection algorithm uses supervised machine learning to determine the difference between business-as-usual GNSS signals and potentially malicious interference/jamming events. It takes, as its input, the spectral intensities measured at each GNSS receiver and outputs a set of detected interference/jamming events, along with a summary of the spectral signature, the central frequency and the bandwidth for each.

Aspects described herein provide advantages of detecting interference/jamming events automatically, allowing for the detection of real-time and historic interference/jamming events, monitoring multiple frequency bands simultaneously, being scalable to any network of GNSS receivers (i.e., not just the UK OS Net network), interference/jamming events are automatically characterized by spectral signature, central frequency, bandwidth and given custom tags to track similar events whilst other characterization types can easily be added.

Further, the present disclosure is an automatic jamming detection system combining and synchronizing data from GNSS receivers and off-the-shelf GNSS jamming detectors.

From the GNSS receivers, we can determine which satellites are "visible" at a given moment in time. If a receiver is in close proximity to a jamming device, there will be a sudden drop in the number of visible satellites. However, an indistinguishable satellite drop-out is also measured when, for example, a surveyor walks under a bridge. The jamming detectors are essentially power meters that measure the signal strength across a specific GNSS bandwidth. If one of these detectors is in close proximity to a jamming device, it will typically record an increase in the signal strength. If, however, the jamming detector is taken under a bridge, it will record a decrease in signal strength. Using both of these devices, jamming events can be reliably identified—if the receiver records a drop-out that corresponds to an increased signal strength, it is likely to be due to jamming or other types of radio interference. In order to determine whether a jamming incident has occurred, data from both devices is synchronized, various features are extracted and then these features are passed through an isolation forest anomaly detection algorithm.

The present disclosure has further advantages of the incident detection being automatic and thus requiring reduced manual intervention, provides improved reliability through synchronization of two data sets and detection of incidents from on-the-ground, mobile receivers which increases coverage and enables more detailed analysis into the state of GNSS jamming.

A first aspect of the disclosure provides a method for detecting and classifying GNSS jamming events, comprising: receiving spectral intensity data recorded by a GNSS receiver at a particular time; processing the spectral intensity data using a Box-Cox transform to obtain a normalized spectral intensity distribution; comparing the normalized spectral intensity distribution with one or more user-definable thresholds to classify whether the normalized spectral intensity data indicates a potential jamming event; (d) repeating the receiving, processing and comparing steps above for different consecutive times to obtain a plurality of potential jamming events; clustering a particular number of consecutive potential jamming events to identify an actual GNSS jamming event; tagging the identified parts of the GNSS signal data to indicate that it is subject to jamming; and outputting the flagged GNSS signal data.

Further steps may include filtering clustered consecutive potential jamming events for consecutive events that exceed a specified time duration.

3                                                                                      4

Further steps may include downloading legacy spectral intensity data recorded by a GNSS receiver from cloud storage.

Further steps may include converting the spectral intensity data into a spectrogram.

Further steps may include an initial Box-Cox transform characterization for a normal service scenario, comprising any or all of: receiving the normal service sample spectral intensity data i.e., spectral intensity data that does not contain a jamming event for each GNSS receiver and band; processing the spectral intensity data for each sample frequency using a Box-Cox transform to obtain a normalized spectral intensity distribution; and storing the transformed parameters for each frequency.

The user tunable threshold may comprise of two parts: a standard deviation threshold, above which a single sample frequency may be determined to be anomalous; and an anomaly count, which may determine how many sample frequencies is enough to consider the whole spectrum as a potential jamming event.

Different combinations of the user tunable thresholds may be applied to target events with different characteristic such as: a high standard deviation threshold and low anomaly count, to detect high intensity, narrow bandwidth jamming events; or a low standard deviation threshold and high anomaly count, to detect low intensity, broad bandwidth jamming events.

The tagging of potential jamming events may include one or more of the following data: the time and data the event started; the time, in seconds, that the event lasted for; the value of each transformed intensity for each sample frequency, averaged over the duration of the event; the spectral width of the block with the highest average score, which is considered the bandwidth of the jamming event; the central frequency within the event bandwidth; and/or an optional name tag, which can be used to link multiple events caused by the same type of jamming device.

The data collected from GNSS receivers may occur within one or more of the L1, L2, L5 and/or E6 GNSS frequency bands.

The GNSS receivers may be part of the OS Net, as described in the introduction and below.

A second aspect described herein provides a method for detecting and classifying GNSS jamming events, comprising any or all of the following steps: receiving GNSS signal data recorded by a GNSS receiver whilst taking a position fix; receiving jamming data indicative of jamming of a GNSS signal during the position fix, the jamming data being generated by a GNSS jamming detector separate from the GNSS receiver; synchronizing the jamming data and the GNSS signal data; identifying parts of the GNSS signal data which are subject to jamming based on the jamming data; grouping a particular number of GNSS signal data parts which are subject to jamming; tagging the identified parts of the GNSS signal data to indicate that it is subject to jamming; and outputting the flagged GNSS signal data.

The particular number of consecutive potential jamming events may relate to a time duration of at least 20 seconds.

The synchronizing of the jamming data and the GNSS signal data may comprise, converting the raw data, which is recorded at discrete time stamps but with different sample frequencies, by interpolating the two data sets together by sampling them both using the same sample intervals.

The sampling intervals may be 2 seconds or 0.5 Hz.

The identification may be completed using feature extraction, comprising: extracting multiple features for each synchronized data; passing each of these features, for each timestamp, through an unsupervised anomaly detection algorithm called an isolation forest; and outputting a Boolean classification for each timestamp of either true or false, wherein true indicates a potential jamming event and false indicates normal service.

The multiple features may include two or more of the following: signal-to-noise ratio for every present satellite; phase for every present satellite; number of visible satellites; mean signal-to-noise ratio of all visible satellites; windowed mean for five, ten and twenty second windows; windowed median for five, ten and twenty second windows; windowed mode for five, ten and twenty second windows; average power from GNSS jamming detector. peak power from GNSS jamming detector; windowed mean power for thirty second window; and differential of windowed mean power for thirty second window.

The identification may be completed using a Box-Cox transformation, comprising: processing the synchronized data using a Box-Cox transform to obtain a normalized distribution; comparing the normalized distribution with one or more user-definable thresholds to classify whether the normalized data indicates a potential jamming event; repeating the processing and comparison steps above for different consecutive times to obtain a plurality of potential jamming events; and clustering a particular number of consecutive potential jamming events to identify an actual GNSS jamming event.

The tagging of potential jamming events data may be standardized between different GNSS receiver types such as Trimble, Septentrio etc. so that different GNSS receiver types may be directly compared despite producing raw data of a different format.

BRIEF DESCRIPTION OF THE DRAWINGS

Examples of the present disclosure are now described with reference to the accompanying drawings, in which.

DETAILED DESCRIPTION

Figure 1:
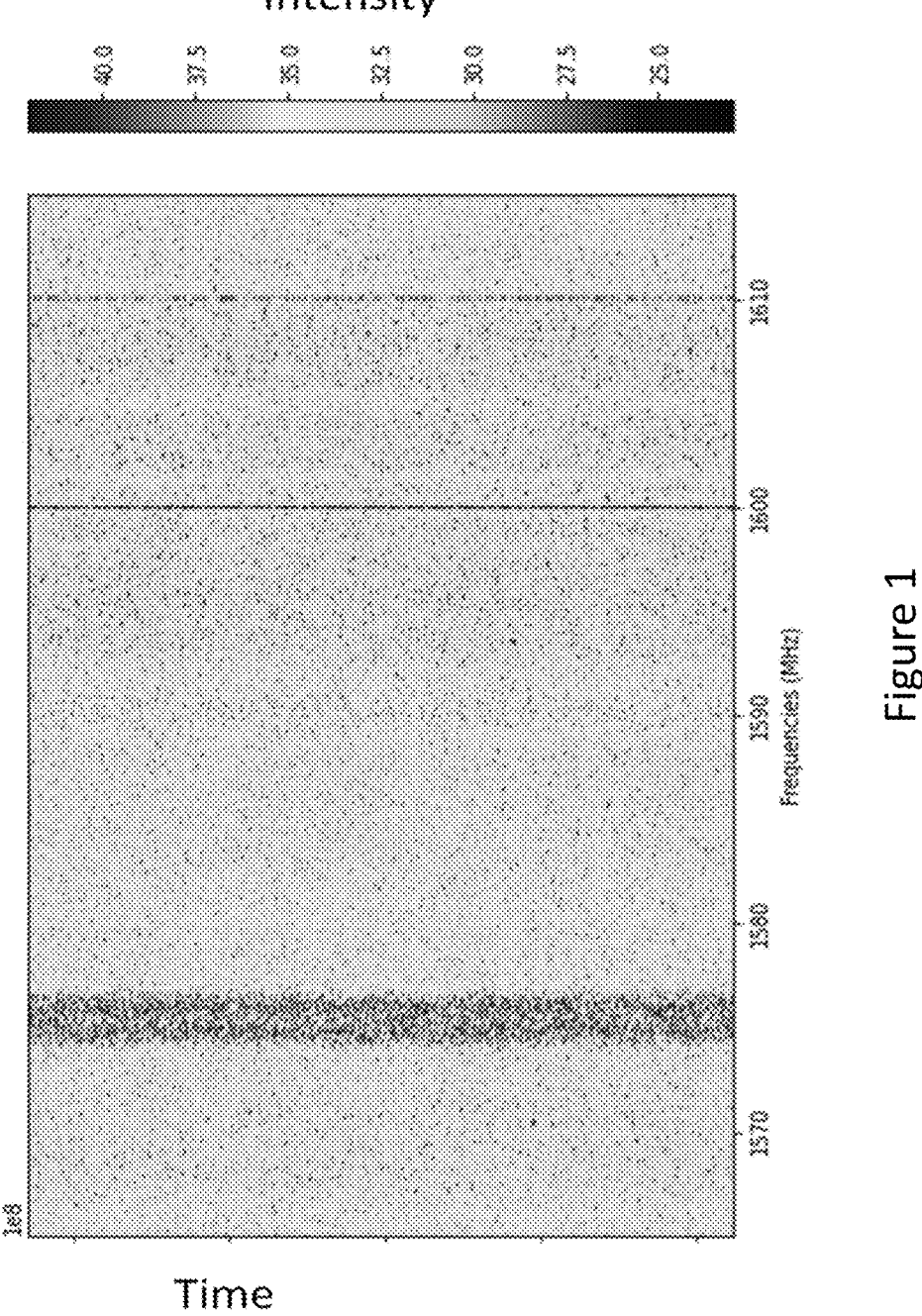
FIG. 1 shows an example spectrogram under normal or business-as-usual conditions, according to one or more illustrative aspects described herein.

Aspects described herein relate to an automatic interference/jamming detection system for use with a GNSS receiver, or alternatively with a GNSS receiver and off-the-shelf jamming detector. The automatic jamming detection system utilizes one of the following two techniques: i) using a jamming detector in conjunction with a GNSS receiver in order to analyze received data for key data indicators for suspicious interference/jamming activities such as signal-to-noise ratio, phase or maximum power; or ii) using a trained jamming detection algorithm to convert received/stored GNSS data into spectrograms to visually highlight anomalies or potential interference/jamming events and then further using a Box-Cox transform to train the algorithm in order to transform data into a normal distribution for comparison against user tunable thresholds to further highlight potential interference/jamming events.

Embodiments described herein make use of a network of accurately surveyed GNSS receivers (such as, in the United Kingdom, the "OS Net" network) to sample GNSS time and provide it to a server that also receive a trusted time signal from a trusted time base, such as a time base from an atomic clock or network of such clocks maintained by trusted parties, such as universities or government bodies. The presence of a geographically widely distributed network of GNSS receivers, acting as a controlled test and operational environment, presents an excellent opportunity to distribute time information to a high level of accuracy. An existing example of a network of suitable accurately placed GNSS receiver is the "OS Net" network of GNSS receivers, maintained by the present Applicant within the United Kingdom. Although the OS Net is geared towards the distribution of information for highly accurate positioning information, there is a need to extend it to the challenge of providing authoritative and highly accurate timing information. There is also a need for a geographically wide such distribution means. The timing-dependent nature of positioning and the characteristics of the OS Net architecture present great opportunity for OS Net to be the basis, noting that the UK needs such a widely-geographically available timing distribution means. As the demand for resilient position, navigation and timing (PNT) services increase, and as the threats and vulnerabilities evolve, OS Net recognises the need to respond and adapt to the evolving threats and vulnerabilities if it is to continue to support the provision of its core task and support for high accuracy services. As society continues to demand more from digital services, so will its reliance upon those that use and enable PNT, thus OS Net will be suitably placed to support national resilient PNT systems and services.

The location for all OS Net stations is defined using established long term surveying techniques, such that a GNSS based disruption to generation of position from a receiver is detectable. This is the basis for the Real Time Kinematic (RTK) augmentation method which is used to generate correction information for rover (mobile) GNSS receivers, enabling 2 cm real time positioning performance. One critical component for RTK services is the ability for the network to provide station data to the processing stages with low latency, thus OS Net is reliant upon timely access to GNSS data. A key aspect of OS Net is station density, where density is optimised as much as is possible to ensure 2 cm performance with built-in redundancy to cover station outages. Within the present disclosure the concept of position monitoring and correction data previously applied to RTK services for positioning is instead applied to time. As a time-based technology, it possible for OS Net to incorporate a time monitoring and thus dissemination capability for a region. In addition, to provide backhaul of measured GNSS time to a central server for processing the incorporation of a fast, low latency, network such as a 5G (or subsequent generation) network with defined timing and synchronisation capabilities would provide a calibration capability between OS Net stations and a central location that is connected to traceable time. In particular the use of a backhaul link that provides for determinable and definable latency (i.e. the time required to transfer the data across the backhaul link(s)) is useful is promoting system reliability.

In one or more aspects described herein, GNSS signal spectral intensities across the L1, L2, L5 and E6 bands are collected across the network of surveyed GNSS receivers—this would be some 115 receivers across the UK, for example. The L1 band corresponds to a frequency of 1575.42 MHz, L2 band corresponds to a frequency of 1227.6 MHz, L5 band corresponds to a frequency of 1176.45 MHz and the E6 band corresponds to a frequency of 1278.75 MHz. The spectral intensity data is kept in cloud storage. Each file contains approximately one minutes worth of data and is named after the station, date and time at which it was recorded.

Before the data is screened for suspicious activity, it is downloaded from cloud storage and converted into a spectrogram i.e., a three-dimensional array of time vs frequency vs intensity.

The jamming detection algorithm works by characterizing the expected spectral pattern for each receiver and then using this characterization to determine if an unseen spectral pattern is anomalous. The initial characterization is created as follows:

A sample spectrogram(s) that is "clean", i.e., does not contain jamming events, is given to the algorithm for each GNSS receiver and band The distribution of intensities for each sample frequency is transformed into a normal distribution using the Box-Cox transform The transformation parameters for each frequency are stored The Box-Cox transformation is used to transform data in order for it to resemble a normal distribution more closely. This is completed using the assumption that errors in the data are normally distributed and thus, allows for hypothesis tests and construction of confidence levels to be performed. Further, the transformation of the data can help to improve the predictive power in models as it can remove white noise from the data.

If w is our transformed variable and y is our target variable, then the following is true:

$$w_t = \begin{cases} \log(y_t) & \text{if } \lambda = 0; \\ \dfrac{y_t^\lambda - 1}{\lambda} & \text{otherwise} \end{cases}.$$

where $\lambda$ is the chosen parameter and t is the designated time period. As can be seen from the above equation, the ideal dataset is when $\lambda=1$, as in this case the data will shift downwards but the overall shape of the data will not change. This means that the data was already normally distributed.

Now, to determine if an unseen spectrum is anomalous or not, the intensity measured at each sample frequency is transformed using the transformation parameters that were determined during the characterization phase. The transformed values are then measured against a set of user tuneable thresholds and given a binary classification of either true (suspicious) or false (not suspicious).

Each threshold comprises of two parts: a standard deviation threshold, above which a single sample frequency is determined to be anomalous, and an anomaly count, which determines how many anomalous sample frequencies is enough to consider the whole spectrum suspicious. Different combinations of these thresholds can be applied to target events with different characteristics. For example, a high standard deviation threshold, coupled with a low anomaly count, will detect high intensity, narrow bandwidth attacks. On the other hand, a low standard deviation threshold, coupled with a high anomaly count, will detect lower intensity, broad bandwidth events.

Anomalous spectra that are close together in time are then clustered together to form continuous blocks of suspicious activity—each block is considered a single potential jamming event.

A full description of each characteristic is given below:
Start Date/Time—the time and date that the event started
Duration—the time, in seconds, that the event lasted for
Spectral Signature—the value of each transformed intensity for each sample frequency, averaged over the duration of the event.
Bandwidth—the spectral signature is compared against a threshold and clustered to find blocks of bandwidth that have been affected by jamming. The spectral width of the block with the highest average anomaly score is considered the bandwidth of the jamming event.
Centre Frequency—the central frequency within the event bandwidth
Tag (Optional)—spectral signatures that look familiar to the user can be "tagged" with a name. This can be used to find multiple events that were caused by the same type of jamming device, or to filter out signatures that are known to be non-malicious.
Events and their characteristics are accumulated over time so that more in-depth analysis can be carried out. This could include finding patterns in behaviour of certain jamming events, understanding regions of high activity, or even predicting future jamming events.

These characteristics are also standardised between different receiver types, so events that are detected using Trimble or Septentrio receivers can be directly compared, despite producing raw data of a different format.

Secondly, surveyors working in conjunction with the GNSS carry GNSS receivers that transmit Receiver Independent Exchange Format (RINEX) data containing signal and phase information for the visible satellites. They may also carry a jamming detector, which essentially incorporates a power metre that monitors the total signal strength within a certain bandwidth. The GNSS receiver and jamming detector can be used in conjunction in order to detect jamming at a surveyor level.

In this case, RINEX receiver data is captured at a different sampling rate compared to the jamming detector data, and thus data preparation must be performed in order for both sets of data to be used in conjunction. In both cases, the raw readings are taken at discrete timestamps, but the sample frequencies are different between the two and don't overlap. The data sets are synchronised to one another by interpolating each time series for a fixed set of timestamps (by default, these sampling timestamps are generated in 2 second or 0.5 Hz intervals).

At this point, the two data sets can be joined to form a single table: each time stamp is attributed with the number of visible satellites, the signal-to-noise ratio (SNR) for each visible satellite, the phase for each visible satellite and an average and peak power reading from the jamming detector. These attributes are expanded by deriving more features. The derived features are all calculated by windowing the data with various window sizes—this adds a wider temporal context for each timestamp.

To train a computational model to detect anomalies or interference/jamming events, key features that might be pertinent to interference/jamming events need to be extracted, this is to be known as "Feature Extraction". The features that are extracted per timestamp are, but not limited to:
Signal-to-Noise Ratio (SNR) for every present satellite
Phase for every present satellite
Number of visible satellites
Mean SNR of all visible satellites
Windowed mean for 5, 10 and 20 second windows
Windowed median for 5, 10 and 20 second windows
Windowed mode for 5, 10 and 20 second windows
Average power from jamming detector
Peak power from jamming detector
Windowed mean power for 30 second window
Differential of windowed mean power for 30 second window Each of these features, for each timestamp, is passed through an unsupervised anomaly detection algorithm called an isolation forest. The output of the isolation forest is a Boolean classification for each timestamp which predicts whether the features are anomalous. An anomaly could be detected that is not jamming, but jamming events are very likely to be detected, i.e., the model tends to overclassify incidents. An additional output from the isolation forest model gives a confidence score for the classification at each timestamp. This can be used to get a metric for how anomalous each suspected jamming event is and then remove some of the false positives.

Further, the isolation forest (IF) is designed and based on decision trees with each tree in the IF being known as an Isolation Tree (iTree) and the premise that anomalous data points are infrequent and different. In theory, the IF has randomly sub-sampled data which is processed in a tree structure, hence the IF name, based on randomly selected features. Anomalous data points are likely to end up in shorter branches on the outer edges of the tree, whereas business-as-usual data will travel further towards the centre of the tree. The IF algorithm can be considered by the following steps:

1. A dataset is sorted into a random sub-sample which is then assigned to an iTree
2. The iTree then undergoes branching by selecting a random feature from the set of designated features. The branching is completed in comparison to a random threshold, the threshold being a value between a maximum and minimum for the selected feature
3. If a data point is smaller than the selected feature threshold then it will be pushed onto a branch on one side of the tree, if it is greater than the selected feature threshold then it will be pushed onto a branch on the opposite side of the tree
4. The process from step 2 is repeated until all data points have been branched
5. The above steps are repeated to construct the random binary iTrees.

After all the iTrees have been constructed and all data points have been branched, the model training is complete, and the IF is constructed. Now, each data point will be assigned a score associated to the depth of the tree required to locate the data point, after the data point has traversed through all the trees which were trained earlier. Therefore, the score is accumulative for the depth from all associated iTrees. Certain scores will be associated with an anomalous result and others associated with business-as-usual scenarios. In the IF, the score for a data point is defined as:

$$s(x, n) = 2^{-\frac{E(h(x))}{c(n)}}$$

where n is the number of external nodes, c(n) is the average path length of unsuccessful search in a Binary Search Tree and h(x) is the path length of observation x.

Due to the sample period being significantly higher than the typical event duration, timestamps that are flagged as anomalies are grouped together, within a specified time window (currently 10 seconds). The grouped anomalies are further filtered, so that only events over a certain duration (20 seconds) remain.

Rapid changes, decreases or increases in a number of these features during the same time period is a key sign that an anomalous interference/jamming event is or has occurred.

FIG. 1 shows an example spectrogram in standard or business-as-usual conditions. The spectrogram us a three-dimensional array of time vs frequency vs intensity. The spectrogram shows a GPS band that can be clearly seen by the section of high intensity centred at around 1575 MHz. This shows how the spectrogram should appear when the receiver is communicating effectively from GNSS.

Figure 2:
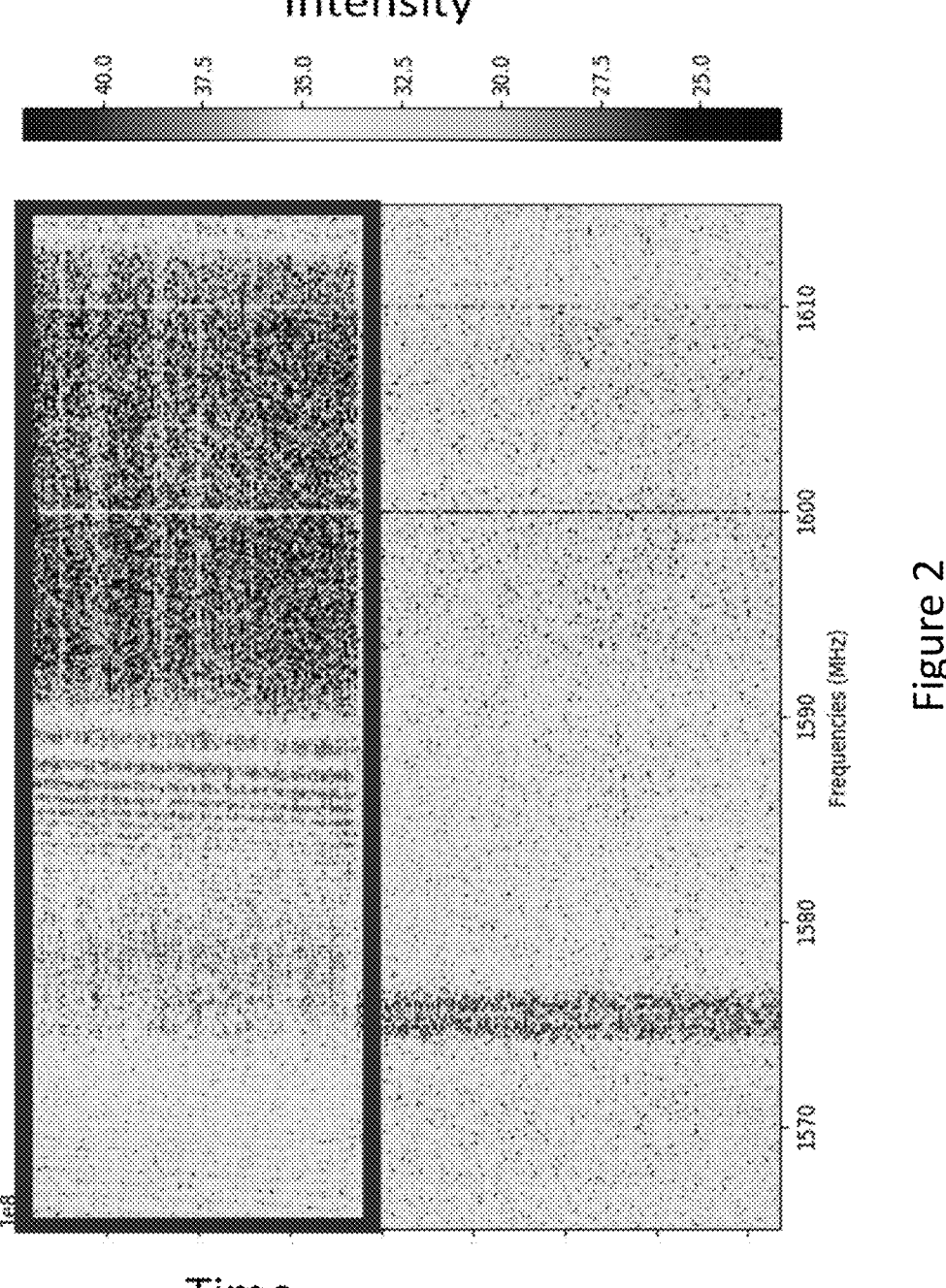
FIG. 2 shows an example spectrogram under an interference/jamming event which is highlighted in red, according to one or more illustrative aspects described herein.

FIG. 2 shows an example spectrogram which contains a suspicious activity of interference/jamming detected by the jamming detection algorithm. As in FIG. 1, the high intensity GPS signal can be seen centred around 1575 MHz. Anomalous spectra that are close together in time are clustered together to form continuous blocks of suspicious activity—each block is considered a single potential jamming event; this is highlighted by the box in FIG. 2. However, during the suspicious jamming activity the GPS is overwhelmed by a rogue interference/jamming signal, which has saturated the receiver, washing out all other signals up to 1615 MHz. From the spectrogram, it is clear that during interference/jamming activity the receiver will struggle to detect the GPS signal and thus, will be unreliable in producing a geolocation value.

Figure 3A:
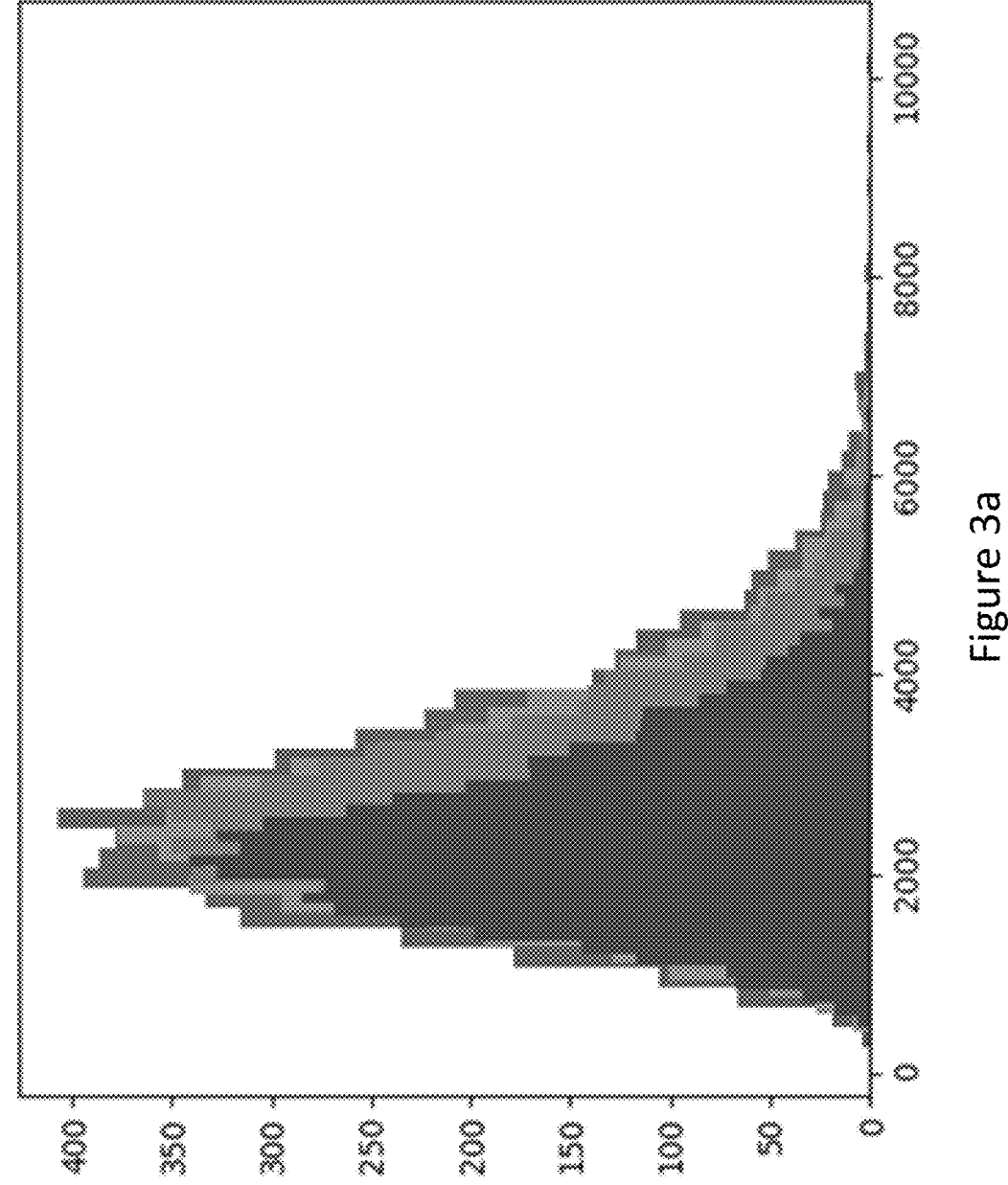
FIG. 3a shows an example graph of amplitude vs frequency for signals received at the receiver, according to one or more illustrative aspects described herein.
Figure 3B:
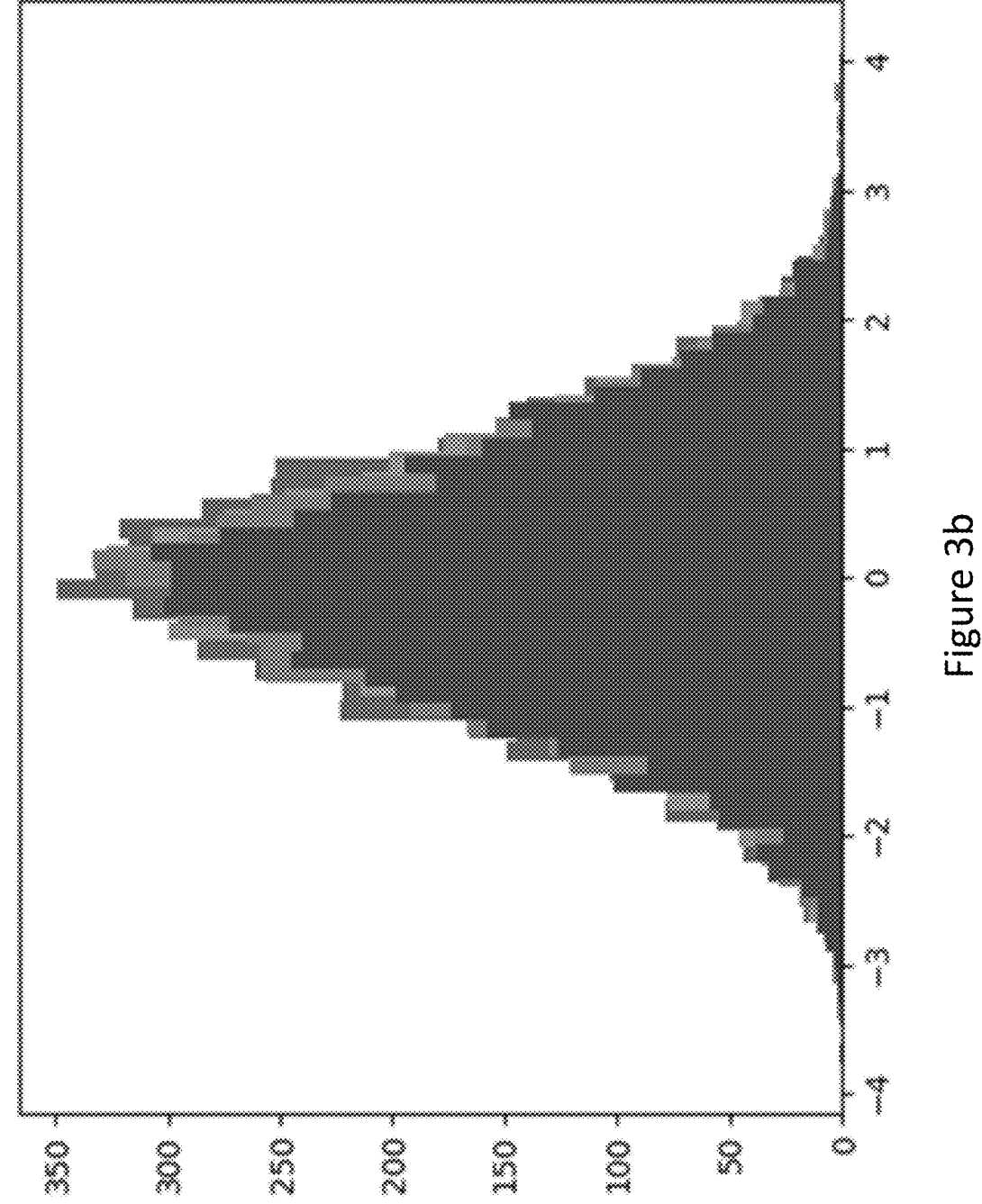
FIG. 3b shows an example normalized distribution graph after a Box-Cox transform has been performed on the FIG. 3a data, according to one or more illustrative aspects described herein.

FIG. 3a shows a graph of amplitude vs frequency for different frequency bands detected at the receiver. FIG. 3b shows the same data from FIG. 3a which has been transformed to a normal distribution using a Box-Cox transform, as described earlier. In this case, the Box-Cox transform can be considered a training step for the automation of the jamming detection. After the data has been normalised, if enough frequency bands measure an amplitude that is above a tunable standard deviation threshold, the event is classed as anomalous and highlights a potential interference/jamming event. The tunable standard deviation threshold can be selected by the user to adjust the sensitivity of the jamming detection. The model can be trained automatically on the assumption that most data it receives at training does not contain interference/jamming events.

Figure 4:
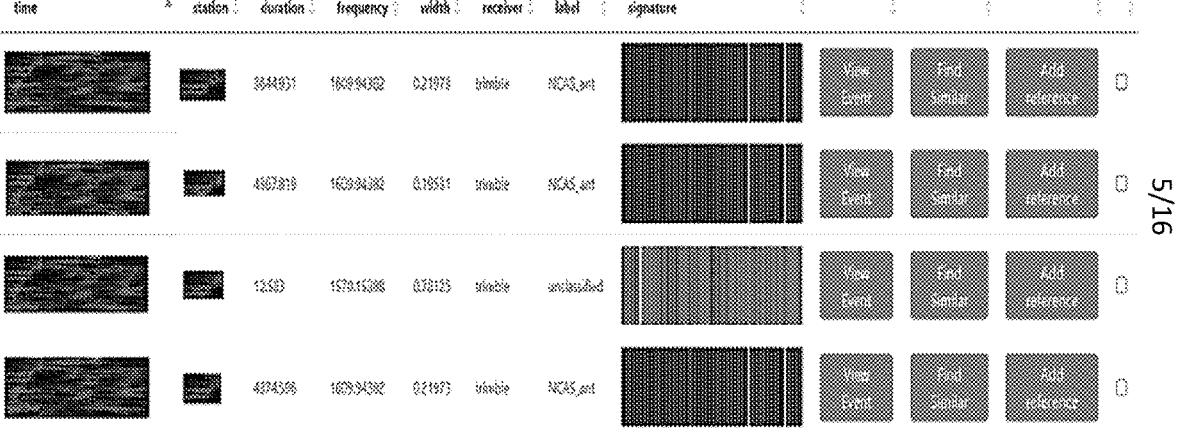
FIG. 4 shows output data from the interference/jamming detection algorithm, including characterizations, according to one or more illustrative aspects described herein.

FIG. 4 shows an example output characterization table. In the characterization table, the suspicious interference/jamming events and their characteristics are accumulated over time so that more in-depth analysis can be carried out. The characteristics are start time/date, duration, spectral signature, bandwidth, central frequency, and tag. The further analysis can include analyzing the patterns to find behavior of certain types of jamming events, understanding regions of higher activity, or even predicting future jamming events.

Figure 5:
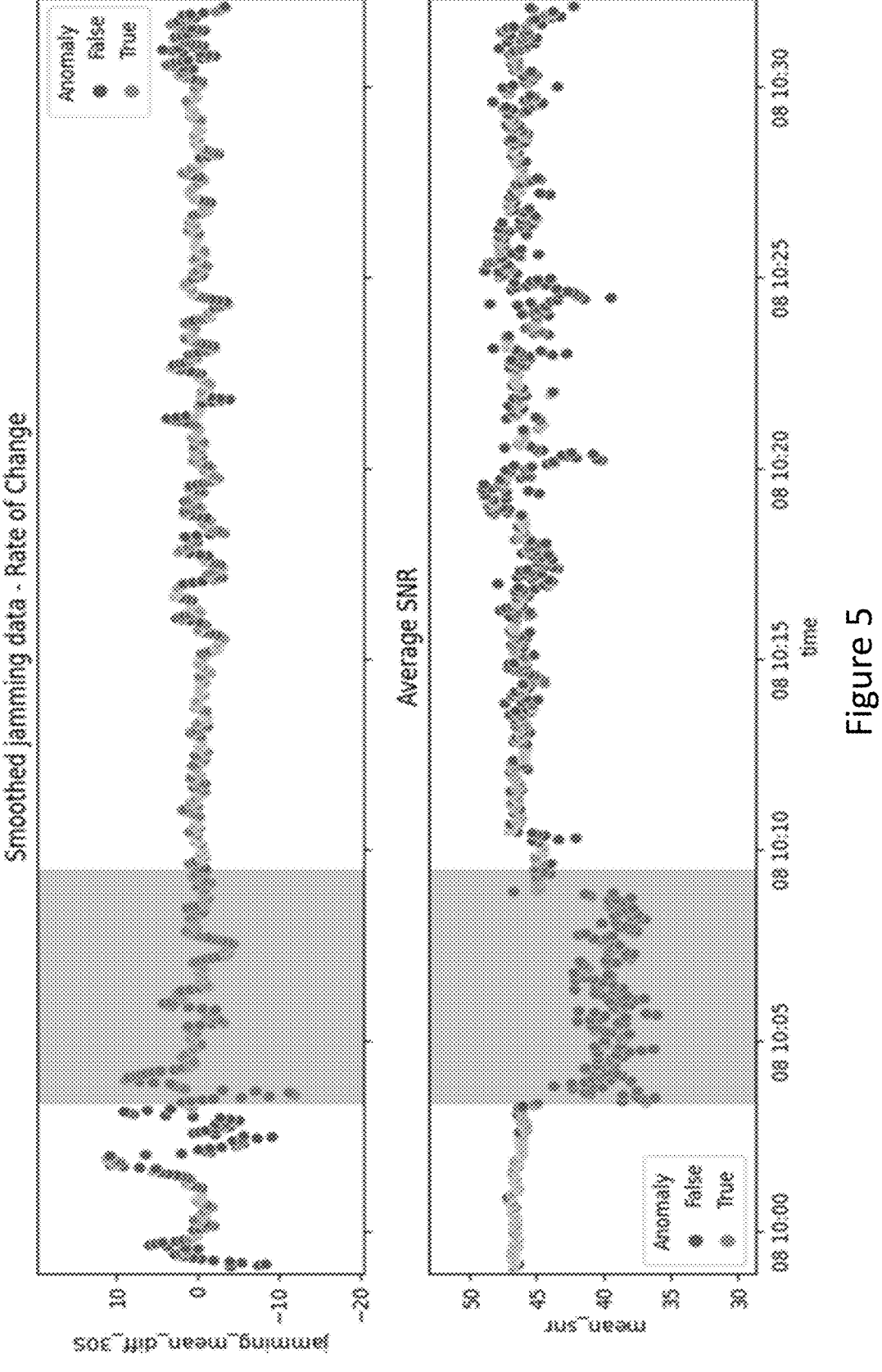
FIG. 5 shows graphs of jamming detector signal rate of change and signal-to-noise ratio vs time. The highlighted area shows a potential suspicious interference/jamming event, according to one or more illustrative aspects described herein.

FIG. 5 shows example graphs of jamming detector signal rate of change and signal-to-noise ratio vs time. Firstly, the upper graph shows jamming detector signal rate of change vs time. The data in the graph is fairly consistent with time. However, there is increased variance in the data between around 08:10:00 and 08:10:09, this could highlight a potentially suspicious interference or jamming event. The lower graph shows SNR vs time. Again, the data in the graph is fairly consistent with time, however, this is an area of reduced SNR (meaning there is a lower signal to noise ratio i.e., most likely the noise floor has increased) between around 08:10:04 and 08:10:09. This again could show a suspicious interference or jamming event. When considering both graphs in tandem, there is increased variance in jamming detector signal rate of change and a reduced SNR between 08:10:04 and 08:10:09 which highlights this period as containing an interference/jamming event, as shown on the graphs by the shaded region.

Figure 6:
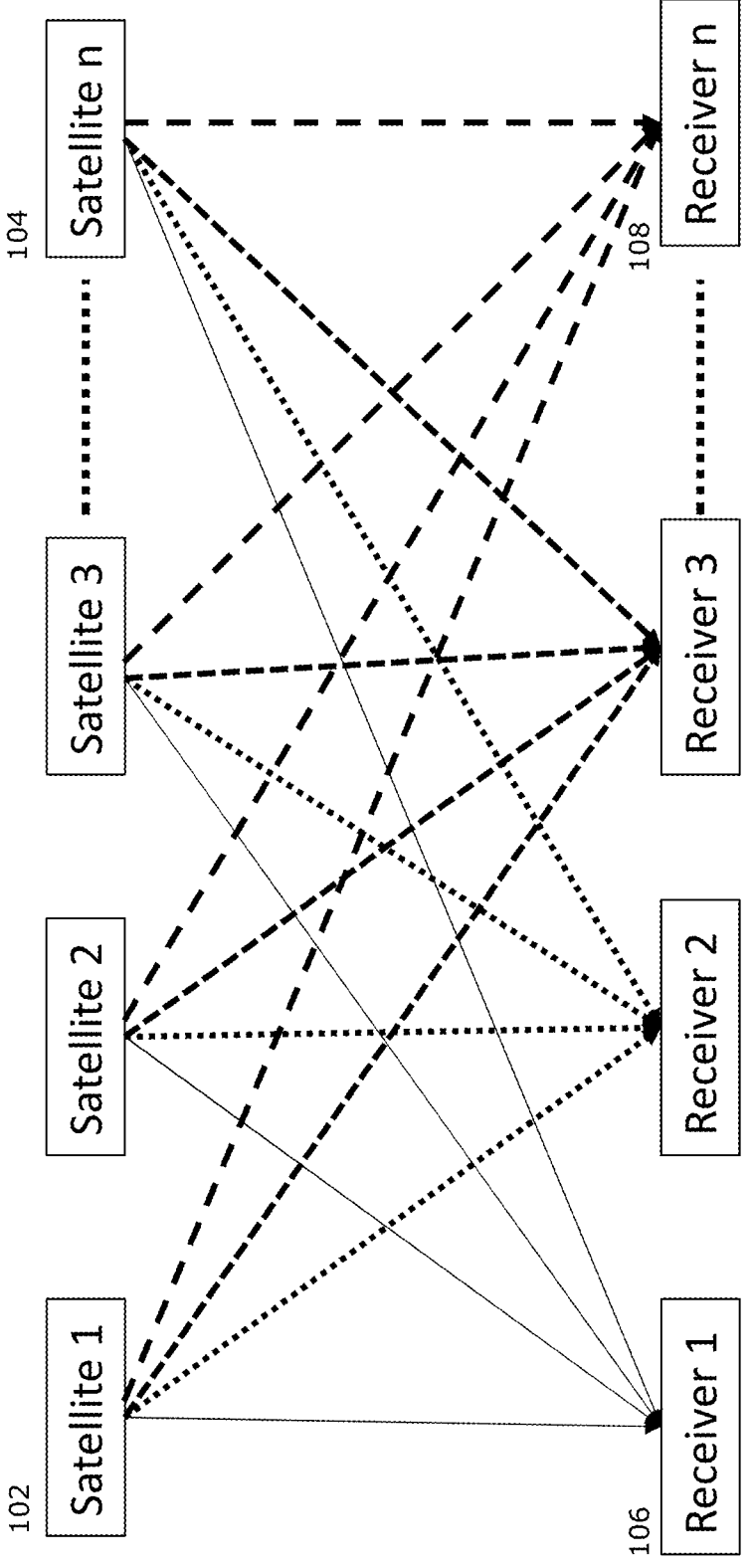
FIG. 6 shows a basic system diagram for a GNSS, according to one or more illustrative aspects described herein.

FIG. 6 shows an example system diagram for a basic GNSS 10. The figure shows the system including Satellite 1 102 to Satellite n 104 in communication with Receiver 1 106 to Receiver n 108. Each Receiver accomplishes geolocational position during receiver GNSS signals from multiple satellites in order to triangulate their relative position. This shows the communication channels working efficiently and reliably with no interference or jamming.

Figure 7:
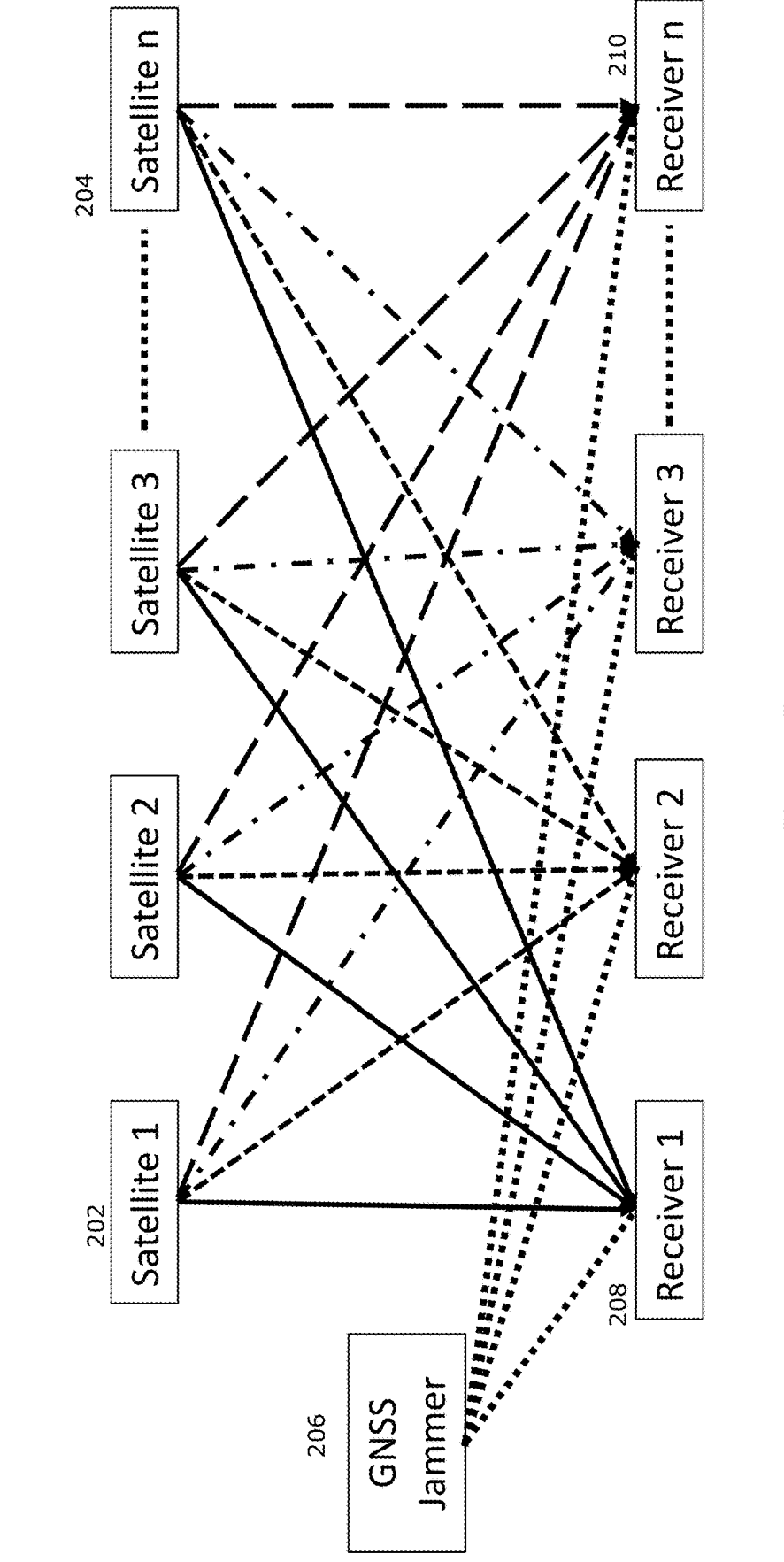
FIG. 7 shows a basic system diagram for a GNSS with a GNSS jammer present, according to one or more illustrative aspects described herein.

FIG. 7 shows an example system diagram for a basic GNSS including a potential GNSS interference or jammer device 20. The figure again shows the system including Satellite 1 202 to Satellite n 204 in communication with Receiver 1 208 to Receiver n 210. Again, each Receiver is attempting to accomplish geolocational positioning by receiving GNSS signals from multiple satellites in order to triangulate their relative position. However, in this instance the receivers are subject to a further signal from the GNSS Jammer 206. This GNSS Jammer may be transmitting signals to the receivers such that the receivers become saturated. If this occurs, then the saturated receiver would not be able to distinguish the GNSS Jammer signal from the Satellite signals and thus geolocation positioning would be impossible, as was shown in FIG. 2.

Figure 8:
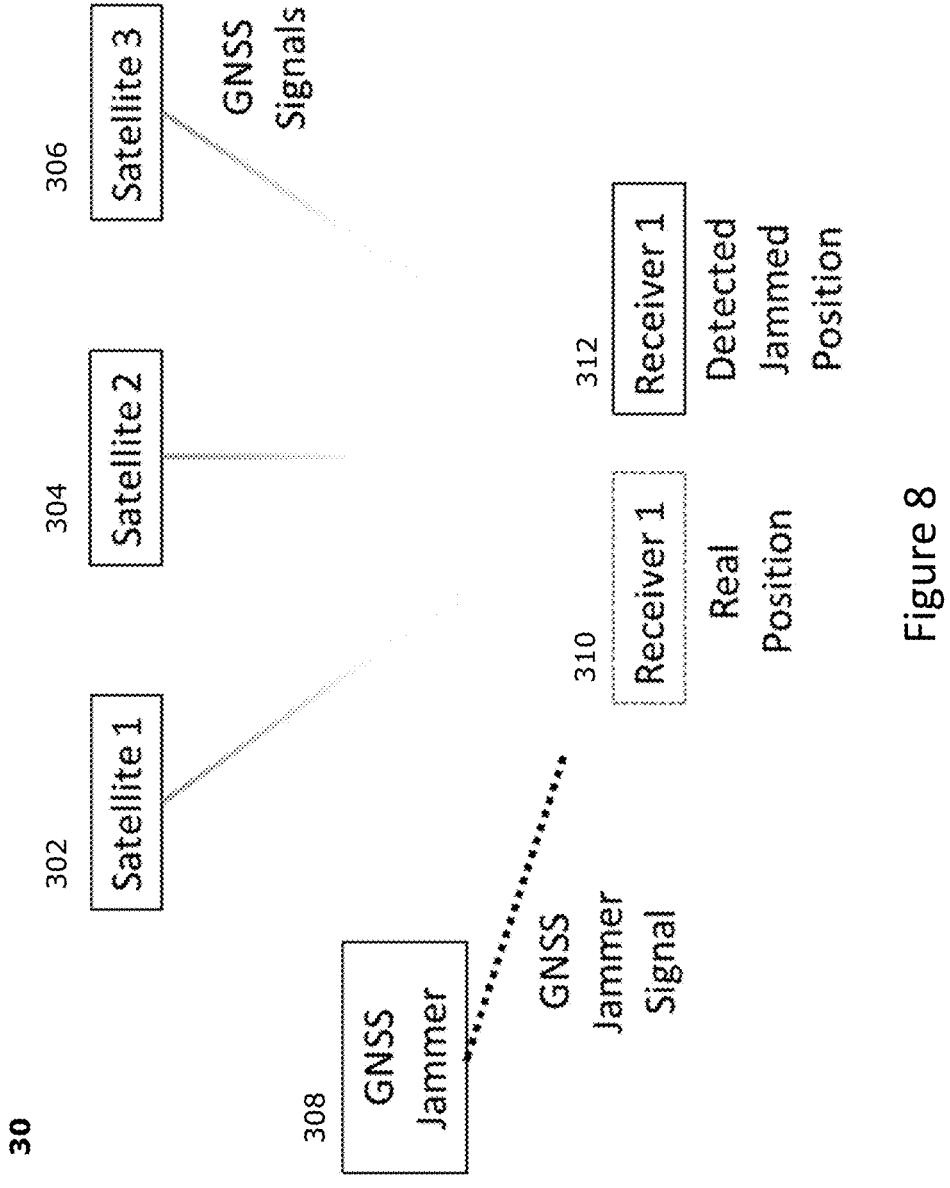
FIG. 8 shows a basic system diagram depicting the effect of a GNSS jammer on the geolocation capability of a GNSS, according to one or more illustrative aspects described herein.

FIG. 8 shows an example system diagram wherein Satellite 1 302, 2 304 and 3 306 are transmitting GNSS signals to be received by Receiver 1 310 in order to perform geolocation positioning 30. However, a GNSS Jammer 308 is also transmitting a GNSS Jammer signal towards Receiver 1. The GNSS Jammer signal is saturating Receiver 1 and causing it to be unable to detect the GNSS signal being transmitted from Satellite 1, 2 and 3. As a result, Receiver 1 is producing inaccurate and unreliable positioning data which can be seen by the difference between the real position 310 and the detected jammed position 312 value. This highlights the effect a GNSS jammer can have on geolocation positioning.

Figure 9:
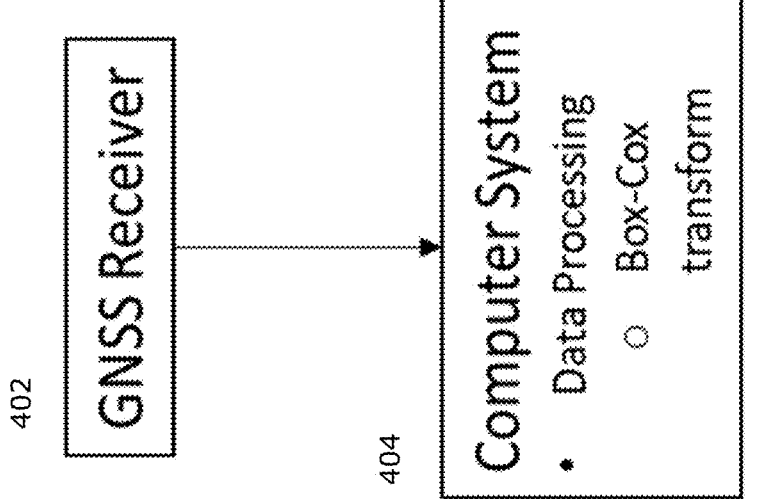
FIG. 9 shows a simple system diagram for Box-Cox GNSS receiver automatic jamming detection, according to one or more illustrative aspects described herein.

FIG. 9 illustrates a simple block diagram for use in the completion of automatic interference/jamming detection using the Box-Cox transform 40. In this example, the system includes a GNSS receiver 402 capable of detecting satellite signals and producing associated data which is communicated to the computer system 404 or central server which can complete the data processing of the GNSS receiver data in order to detect anomalous data points that could potentially highlight an interference/jamming event. The data processing completed by the computer system or central server will most notably be the Box-Cox transform but also include any other required calculations, comparisons, or thresholding.

Figure 10:
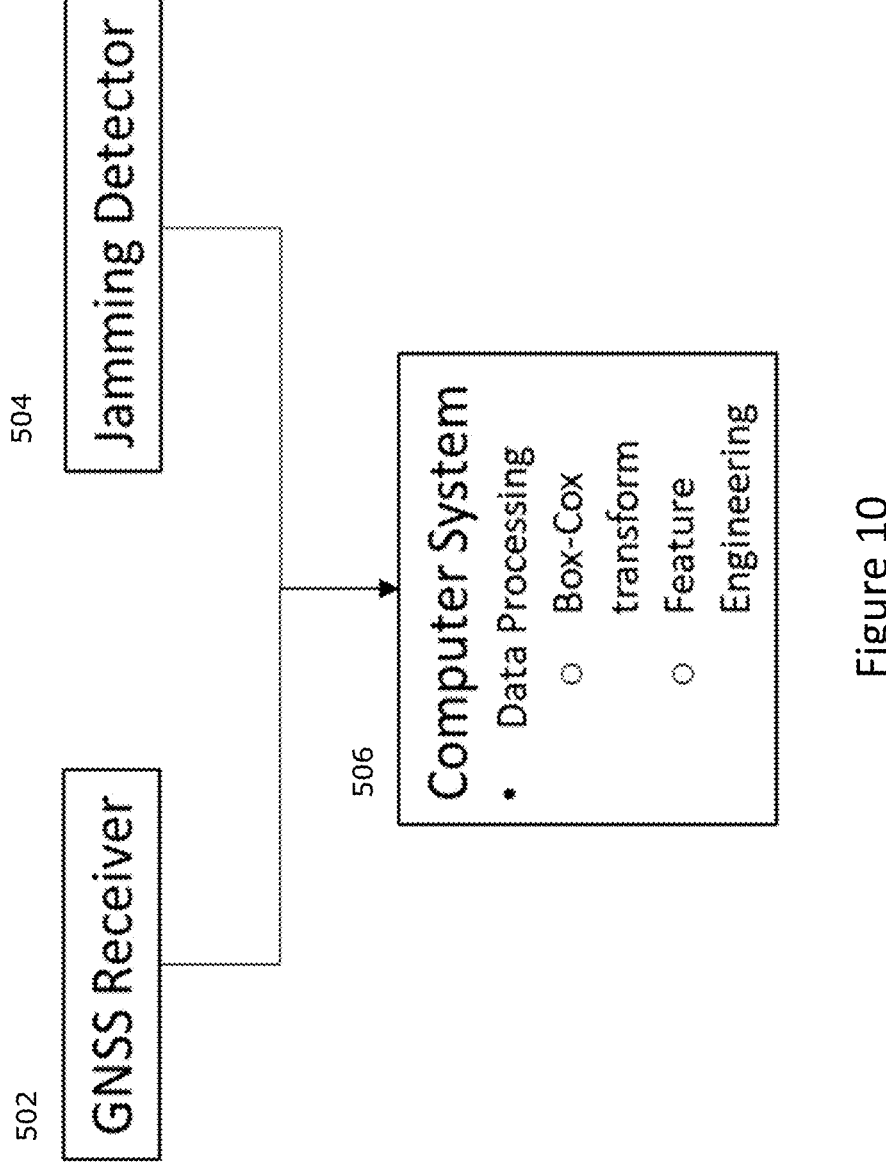
FIG. 10 shows a simple system diagram for GNSS surveyor automatic jamming detection, according to one or more illustrative aspects described herein n.

FIG. 10 illustrates a simple block diagram for use in the completion of automatic interference/jamming detection using GNSS receivers and off-the-shelf GNSS jamming detectors 50. In this example, the system includes a GNSS receiver 502 capable of detecting satellite signals and producing associated data which is communicated to the computer system 506 or central server. The system also includes an off-the-shelf GNSS jamming detector 504 which is capable of detecting signal strength parameters among other parameters which are communicated to the computer system or central server. The computer system or central server completes the data processing in order to achieve automatic interference/jamming event detection. In this case, the computer system completes the data synchronization required to bring the GNSS receiver data and GNSS jamming detector into alignment. The computer system then completes further data analysis in order to detect interference/jamming events, the further analysis could include the Box-Cox transform, feature engineering and thresholding etc. Further, the computer system completes any other required calculation, comparisons, or thresholding.

Figure 11:
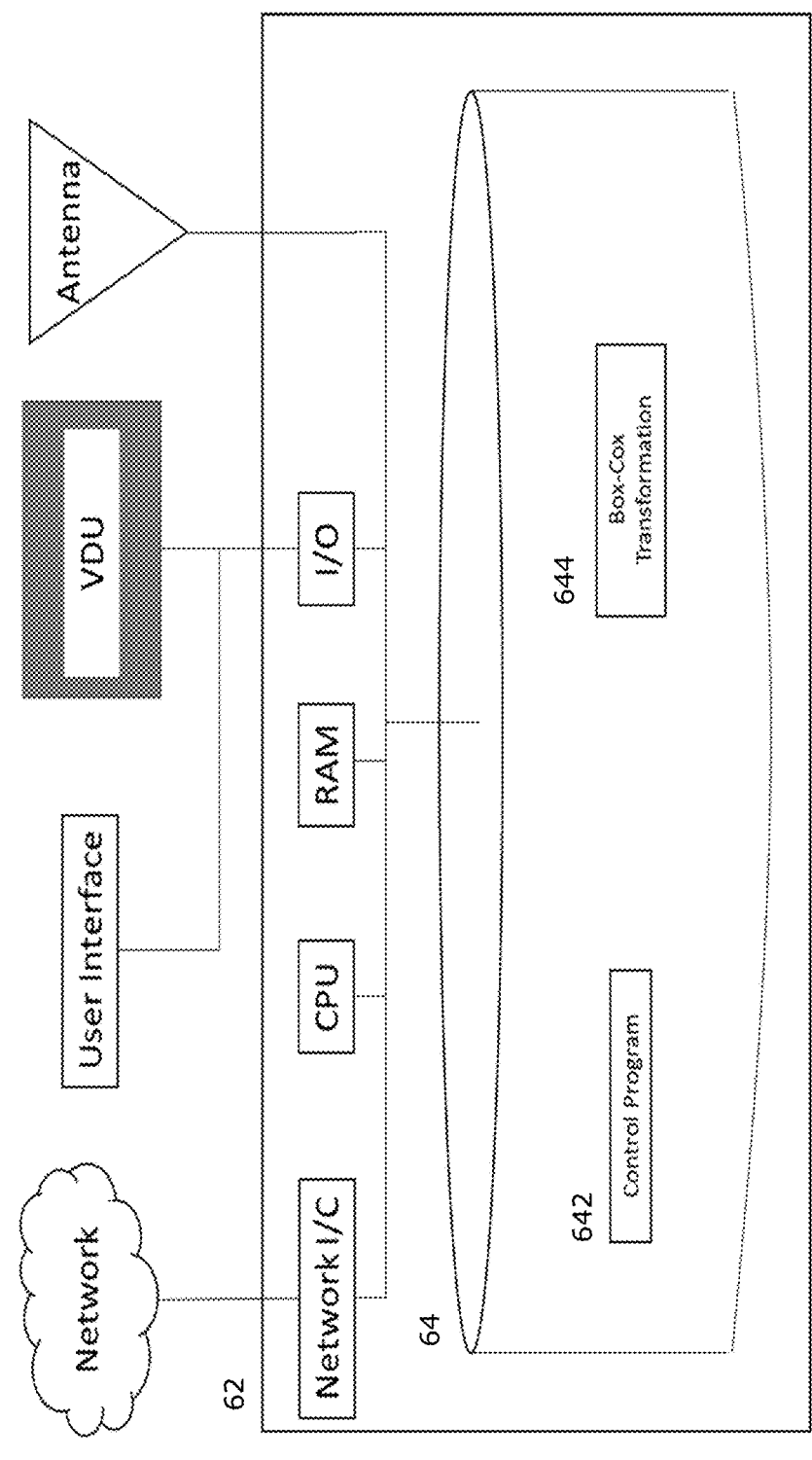
FIG. 11 shows a block diagram of a computer system for use with a GNSS receiver, according to one or more illustrative aspects described herein.

FIG. 11 illustrates a block diagram of a computer system 60 for use as a receiver in a GNSS transmitter and receiver system, which can form the processing platform for receiving GNSS signals and completing the jamming detection algorithm. The computer system comprises a central processing unit (CPU), random access memory (RAM), and input/output (I/O) ports into which data can be received and output therefrom as is well known in the art. Additionally included is a visual display unit (VDU) such as an LCD screen or alike, a user interference which could include a touch sensitive screen, keyboard etc. The computer system also includes an antenna which is designed to receive GNSS signals transmitted by corresponding satellites. Further, the computer system includes a network connection connected via a network integrated circuit (I/C), which is used for connection to cloud storage by which data can be downloaded or stored using cloud storage.

The computer system 60 also includes some non-volatile storage 62 such as a hard disk drive, solid-state drive, or NVMe drive. Stored on the non-volatile storage is several executable computer programs 64. Overall control of the system and the fundamental signal receiving is undertaken by the control program 642, which operates in an overarching control mode to run the other programs and functions to be described to be performed. The system also includes a Box-Cox Transformation program 644 to complete the jamming detection algorithm of the GNSS signal receiving.

Figure 12:
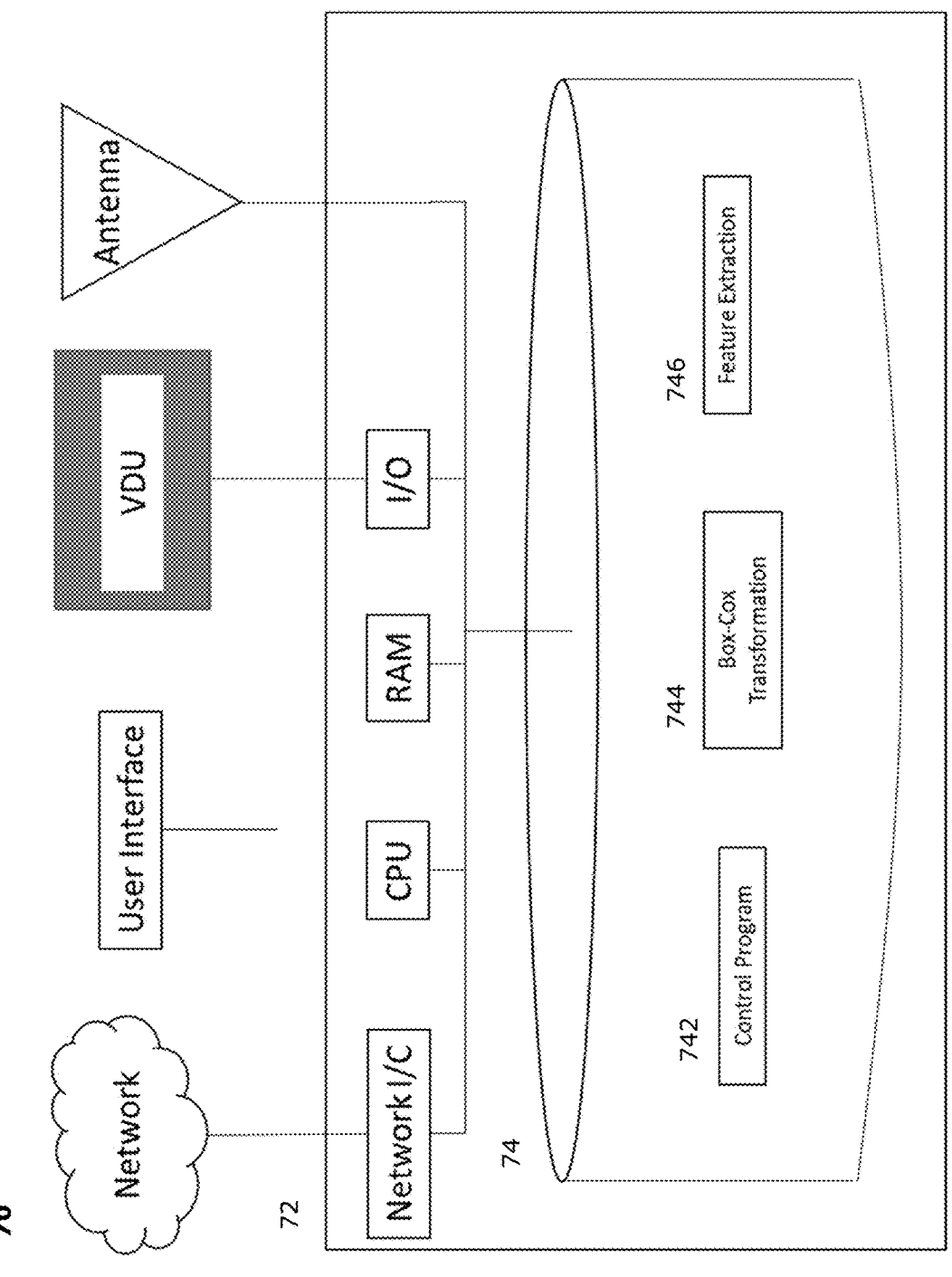
FIG. 12 shows a block diagram of a computer system for use with a GNSS receiver and jamming detector, according to one or more illustrative aspects described herein.

FIG. 12 illustrates a block diagram of a computer system 70 for use as a receiver in a GNSS transmitter and receiver system, which can form the processing platform for receiving GNSS signals and completing the jamming detection algorithm. The computer system comprises a central processing unit (CPU), random access memory (RAM), and input/output (I/O) ports into which data can be received and output therefrom as is well known in the art. Additionally included is a visual display unit (VDU) such as an LCD screen or alike, a user interference which could include a touch sensitive screen, keyboard etc. The computer system also includes an antenna which is designed to receiver GNSS signals transmitted by corresponding satellites. Further, the computer system 70 includes a network connection connected via a network integrated circuit (I/C), which is used for connection to cloud storage by which data can be downloaded or stored using cloud storage.

The computer system 70 also includes some non-volatile storage 72 such as a hard disk drive, solid-state drive, or NVMe drive. Stored on the non-volatile storage 72 is several executable computer programs 74. Overall control of the system and the fundamental signal receiving is undertaken by the control program 742, which operates in an overarching control mode to run the other programs and functions to be described to be performed. The system also includes a Box-Cox Transformation program 744 to complete the jamming detection algorithm of the GNSS signal receiving as in FIG. 11, however, the system also includes a Feature Extraction program 746 which can complete the feature detection, extraction and comparison required to complete another method of jamming detection of the GNSS signal.

Figure 13:
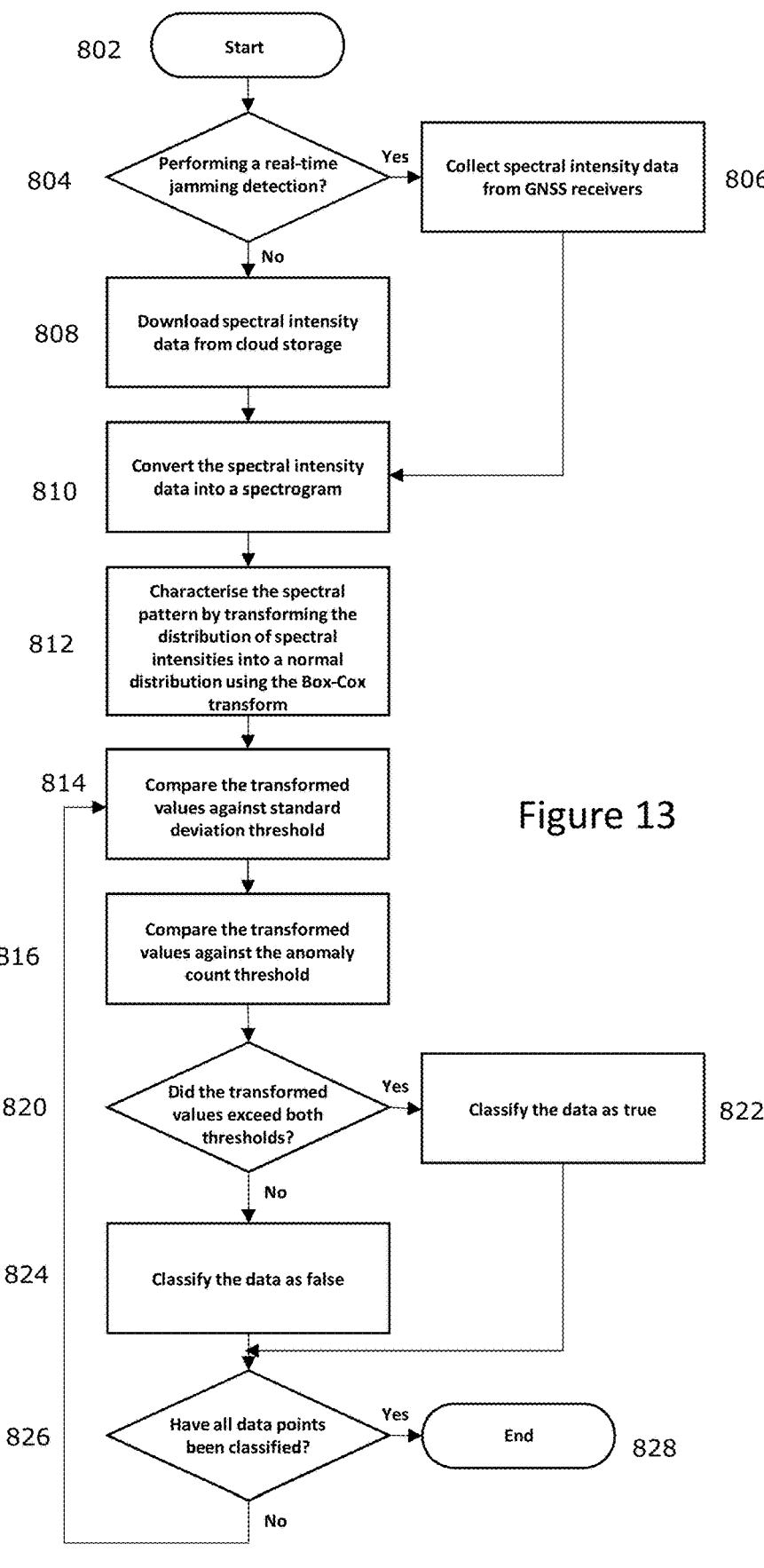
FIG. 13 shows a computer system flow diagram for use with GNSS receivers, according to one or more illustrative aspects described herein.

FIG. 13 shows a computer system flow diagram 80 for use with GNSS receivers. Upon start 802 of the computer system a decision is made regarding whether jamming detection of real-time or historic data 804 is to be completed. If real-time jamming detection is to be completed, then the computer system will look to collect spectral intensity data from the GNSS receivers 806. If historic jamming detection is to be completed, then the computer system will download spectral intensity data from the GNSS receivers which is stored in cloud storage 806. Each data file contains approximately one minutes worth of GNSS receiver data and is named after the station, date and time at which it was recorded. In either scenario, the data is then converted from the raw spectral intensity data into a spectrogram 810. Next, the spectral patterns are characterized by transforming the distribution of spectral intensities for each sample frequency into a normal distribution using the Box-Cox transform 812. An initial characterization for each receiver is already stored in the computer system to give the expected spectral pattern for a business-as-usual event at that receiver. This initial characterization includes taking a sample business-as-usual spectrogram i.e., one that does not contain a jamming event, for each receiver and frequency band, the distribution of spectral intensities for each sample frequency is normalized using the Box-Cox transform and then the transformation parameters for each frequency band are stored. This can act as a benchmark to help highlight potential jamming events.

Next, the transformed values of the data to be checked for jamming events are compared against the user tunable thresholds. Thus, the data is compared against the standard deviation threshold 814 and the anomaly count threshold 816. If the transformed data values exceed the standard deviation and the anomaly count thresholds 820, then the data is considered to contain a potential jamming event and the data is classified as true 822. If the transformed data values do not exceed both the standard deviation and anomaly count threshold then the data is considered to not contain a jamming event and the data is classified as false 824. The system will then check if there is further data to classify 826. If there is further data to classify then the system will return and repeat the steps required to compare the transformed data against the thresholds. If there is no further data to be classified, then the system will end 828.

Figure 14:
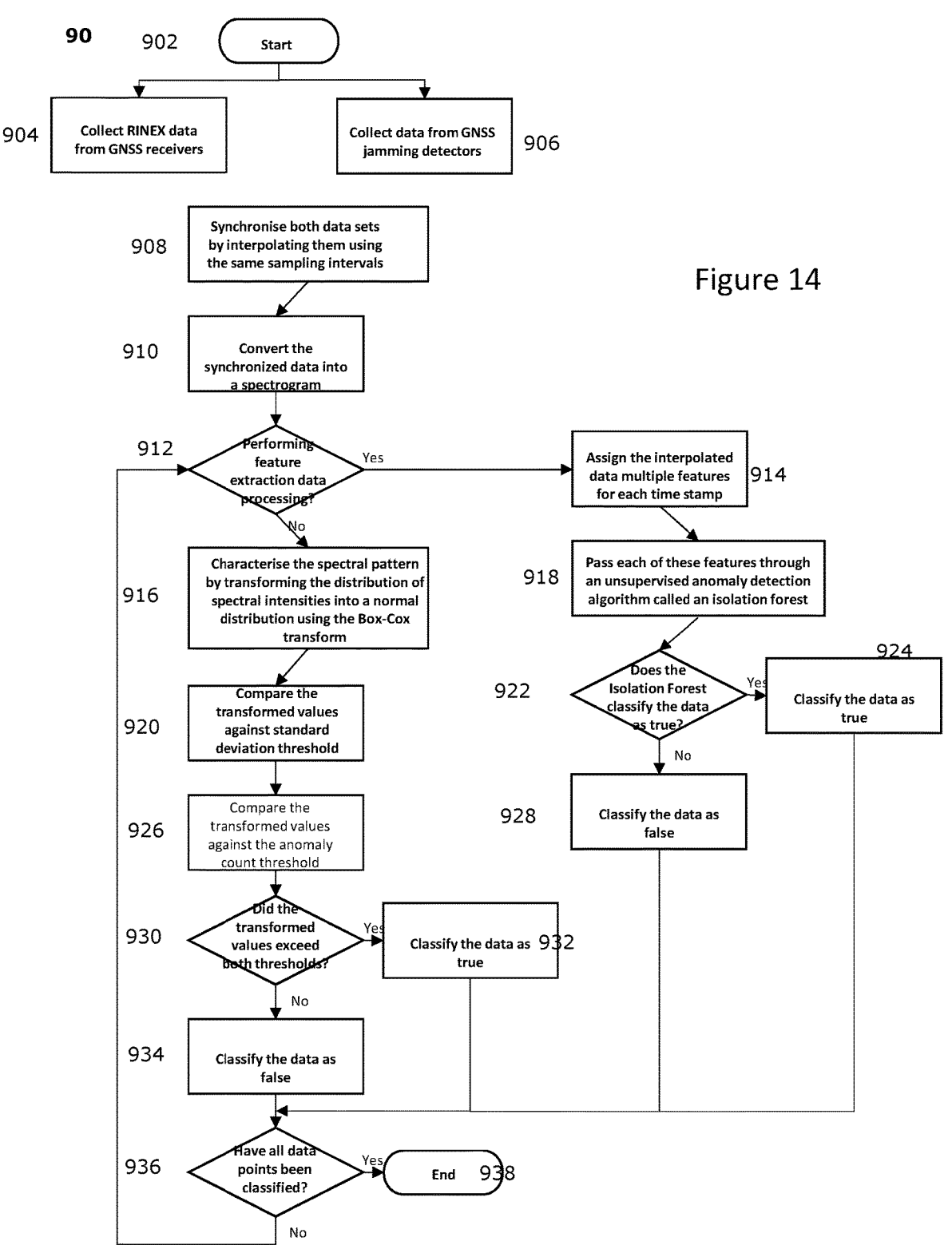
FIG. 14 shows the computer system flow diagram for use with GNSS receivers and an off-the-shelf GNSS jamming detector, according to one or more illustrative aspects described herein.

FIG. 14 shows the computer system flow diagram 90 for use with GNSS receivers and an off-the-shelf GNSS jamming detector. Upon start 902, the of the computer system the computer will collect RINEX data from the GNSS receivers 904 as well as collecting data from the GNSS jamming detectors 906. The raw data from both sources are taken at discrete timestamps, however, using different sample frequencies and thus the raw data does not overlap. Therefore, the data sets are synchronized by interpolating the two data sets by sampling them both at the same sampling frequency 908. The synchronized data is then converted into spectrograms 910. At this point, a decision is made about how to process the data 912, between Box-Cox transform processing or feature extraction processing. If Box-Cox transform processing is to be used, then the spectral patterns are characterized by transforming the distribution of spectral intensities for each sample frequency into a normal distribution using the Box-Cox transform 916. An initial characterization for each receiver is already stored in the computer system to give the expected spectral pattern for a business-as-usual event at that receiver. This initial characterization includes taking a sample business-as-usual spectrogram i.e., one that does not contain a jamming event, for each receiver and frequency band, the distribution of spectral intensities for each sample frequency is normalized using the Box-Cox transform and then the transformation parameters for each frequency are stored. This can act as a benchmark to help highlight potential jamming events.

Next, the transformed values of the data to be checked for jamming events are compared against the user tunable thresholds. Thus, the data is compared against the standard deviation threshold 920 and the anomaly count threshold 926. If the transformed data values exceed the standard deviation and the anomaly count thresholds, then the data is considered to contain a potential jamming event and the data is classified as true 932. If the transformed data values do not exceed both the standard deviation and anomaly count threshold then the data is considered to not contain a jamming event and the data is classified as false 934. If feature extraction processing is to be used, then the interpolated data is assigned multiple features for each time stamp 914, these features include the SNR, phase, mean SNR and many more. The data including all the associated features is then passed through an unsupervised anomaly detection algorithm known as an Isolation Forest 918. Once, the Isolation Forest has completed the processing and classified the data as either anomalous or not anomalous, the computer system will check whether the Isolation Forest has classified the data as true 922 i.e., containing a potential jamming event. If this is the case, then the data will be classified as true 924, if it is not the case and the Isolation Forest classifies the data as not containing a potential jamming event, then the data will be classified as false 928. Next, irrespective of whether Box-Cox transform, or feature extraction was performed, the computer will check to see if there are data points still to be classified 936. If there is further data to classify then the system will return and repeat the steps required to complete data processing. If there is no further data to be classified, then the system will end 938.

Figure 15:
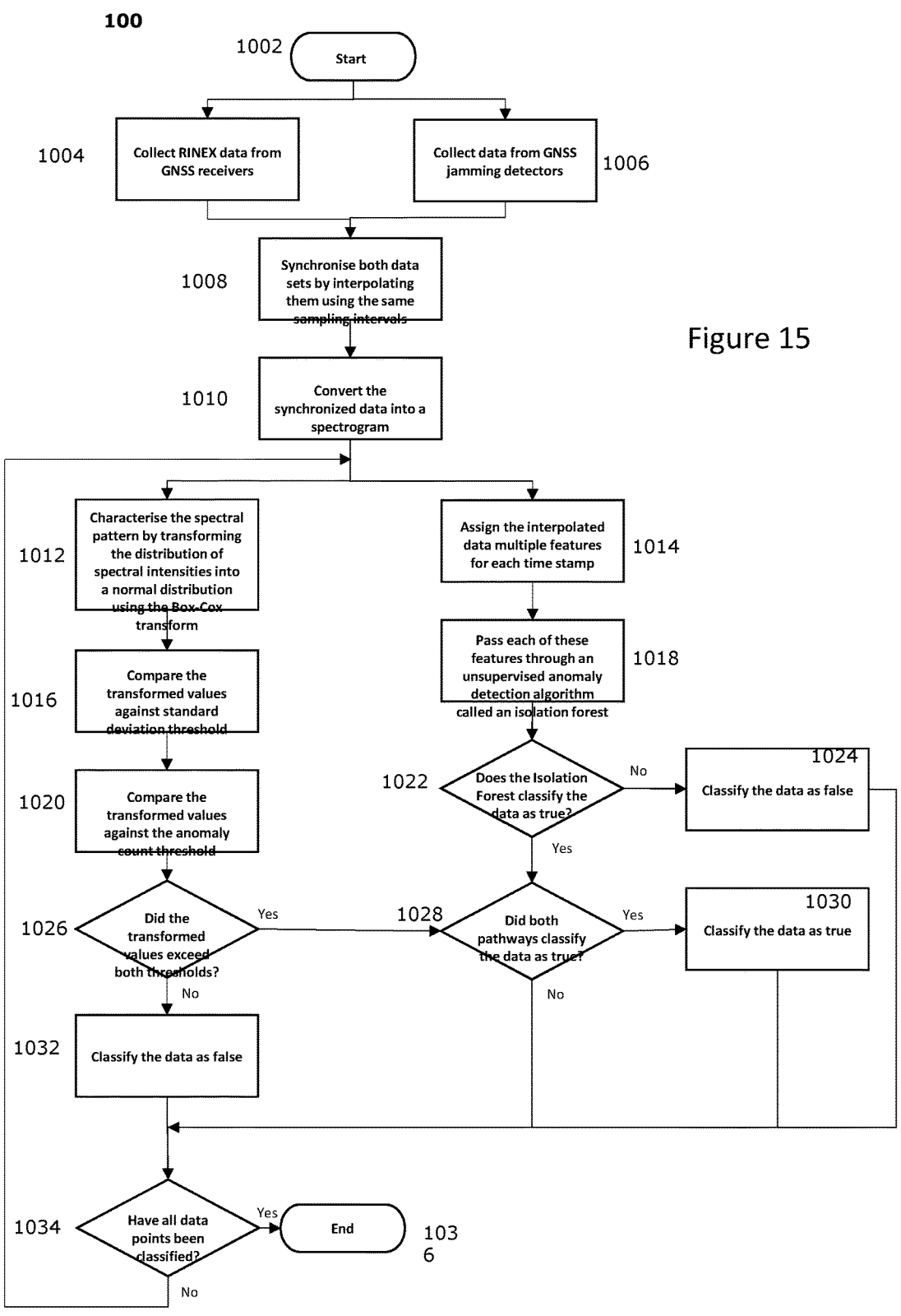
FIG. 15 shows a further example of the computer system flow diagram for use with the GNSS receivers and an off-the-shelf GNSS jamming detector, according to one or more illustrative aspects described herein.

FIG. 15 shows a further example of a computer system flow diagram 100 for use with the GNSS receivers and an off-the-shelf GNSS jamming detector. FIG. 15 is similar to FIG. 14; however, the main difference is that rather than Box-Cox transform, or feature extraction being performed, both are performed in tandem. Therefore, upon start 1002, the computer system will collect RINEX data from the GNSS receivers 1004 as well as collecting data from the GNSS jamming detectors 1006. The raw data from both sources are taken at discrete timestamps, however, using different sample frequencies and thus the raw data does not overlap. The data sets are synchronized by interpolating the two data sets by sampling them both at the same sampling frequency 1008. The synchronized data is then converted into spectrograms 1010. At this point, the computer system proceeds into two channels; one which performs Box-Cox transform processing and the other performing feature extraction processing. During Box-Cox transform processing the spectral patterns are characterized by transforming the distribution of spectral intensities for each sample frequency into a normal distribution using the Box-Cox transform 1012. An initial characterization for each receiver is already stored in the computer system to give the expected spectral pattern for a business-as-usual event at that receiver. This initial characterization includes taking a sample business-as-usual spectrogram i.e., one that does not contain a jamming event, for each receiver and frequency band, the distribution of spectral intensities for each sample frequency is normalized using the Box-Cox transform and then the transformation parameters for each frequency are stored. This can act as a benchmark to help highlight potential jamming events.

Next, the transformed values of the data to be checked for jamming events are compared against the user tunable thresholds. Thus, the data is compared against the standard deviation threshold 1016 and the anomaly count threshold 1020. If the transformed data values do not exceed both 1026 the standard deviation and anomaly count threshold then the data is considered to not contain a jamming event and the data is classified as false 1032. During feature extraction processing the interpolated data is assigned multiple features for each time stamp 1014, these features include the SNR, phase, mean SNR and many more. The data including all the associated features is then passed through an unsupervised anomaly detection algorithm known as an Isolation Forest 1018. Once, the Isolation Forest has completed the processing and classified the data as either anomalous or not anomalous, the computer system will check whether the Isolation Forest has classified the data as true 1022. If the Isolation Forest classifies the data as not containing a potential jamming event, then the data will be classified as false 1024. At this point, if the data from the Box-Cox transform processing exceeded the thresholds and was classified as true by the Isolation Forest 1028 in the feature extraction processing then the data will be classified as true 1030 i.e., containing a potential jamming event. Finally, the computer will check to see if there are data points still to be classified 1034. If there is further data to classify then the system will return and repeat the steps required to complete data processing. If there is no further data to be classified, then the system will end 1036.

Various modifications, whether by addition, substitution, or deletion will be apparent to the intended reader to provide further embodiments of the present disclosure, any and all of which are intended to be encompassed by the appended claims.

The invention claimed is:

1. A method for detecting and classifying GNSS jamming events, comprising:
   (a) receiving spectral intensity data recorded by a GNSS receiver at a particular time;
   (b) processing the spectral intensity data using a Box-Cox transform to obtain a normalized spectral intensity distribution;
   (c) comparing the normalized spectral intensity distribution with one or more user-definable thresholds to classify whether the normalized spectral intensity data indicates a potential jamming event, wherein the user tunable threshold comprises: (a) a standard deviation threshold, above which a single sample frequency is determined to be anomalous; and (b) an anomaly count, which determines how many sample frequencies is enough to consider the whole spectrum as a potential jamming event;
   (d) repeating steps (a) to (c) above for different consecutive times to obtain a plurality of potential jamming events;
   (e) clustering a particular number of consecutive potential jamming events to identify an actual GNSS jamming event;
   (f) tagging the identified parts of the GNSS signal data to indicate that it is subject to jamming; and
   (g) outputting the flagged GNSS signal data.

2. A method according to claim 1, further comprising filtering clustered consecutive potential jamming events for consecutive events that exceed a specified time duration.

3. A method according to claim 1, further comprising downloading legacy spectral intensity data recorded by a GNSS receiver from cloud storage.

4. A method according to claim 1, further comprising converting the spectral intensity data into a spectrogram.

5. A method according to claim 1, wherein the method further comprises an initial Box-Cox transform characterization for a normal service scenario, comprising:
   receiving the normal service sample spectral intensity data i.e., spectral intensity data that does not contain a jamming event for each GNSS receiver and band;
   processing the spectral intensity data for each sample frequency using a Box-Cox transform to obtain a normalized spectral intensity distribution; and
   storing the transformed parameters for each frequency.

6. A method according to claim 1, wherein different combinations of the user tunable thresholds can be applied to target events with different characteristic such as:
   a high standard deviation threshold and low anomaly count, to detect high intensity, narrow bandwidth jamming events; or
   a low standard deviation threshold and high anomaly count, to detect low intensity, broad bandwidth jamming events.

7. A method according to claim 1, wherein the tagging of potential jamming events includes one or more of the following data:
   the time and data the event started;
   the time, in seconds, that the event lasted for;
   the value of each transformed intensity for each sample frequency, averaged over the duration of the event;
   the spectral width of the block with the highest average score, which is considered the bandwidth of the jamming event;
   the central frequency within the event bandwidth; and/or
   an optional name tag, which can be used to link multiple events caused by the same type of jamming device.

8. A method according to claim 1, wherein the data collected from GNSS receivers occurs within one or more of the L1, L2, L5 and/or E6 GNSS frequency bands.

9. A method according to claim 1, wherein the GNSS receivers are part of a network of surveyed GNSS receivers.

10. A method for detecting and classifying GNSS jamming events, comprising:
   (a) receiving GNSS signal data recorded by a GNSS receiver whilst taking a position fix;
   (b) receiving jamming data indicative of jamming of a GNSS signal during the position fix, the jamming data being generated by a GNSS jamming detector separate from the GNSS receiver;
   (c) synchronizing the jamming data and the GNSS signal data, wherein synchronizing the jamming data and the GNSS signal data comprises, converting the raw data, which is recorded at discrete time stamps but with different sample frequencies, by interpolating the two data sets together by sampling them both using the same sample intervals;
   (d) identifying parts of the GNSS signal data which are subject to jamming based on the jamming data;
   (e) grouping a particular number of GNSS signal data parts which are subject to jamming;
   (f) tagging the identified parts of the GNSS signal data to indicate that it is subject to jamming; and
   (g) outputting the tagged GNSS signal data.

11. A method according to claim 10, wherein the particular number of GNSS signal data parts relates to a time duration of at least 20 seconds.

12. A method according to claim 10, wherein the sampling intervals are 2 seconds or 0.5 Hz.

13. A method according to claim 10, wherein the identification is completed using feature extraction, comprising:
   extracting multiple features for each synchronized data;
   passing each of these features, for each timestamp, through an unsupervised anomaly detection algorithm called an isolation forest; and
   outputting a Boolean classification for each timestamp of either true or false, wherein true indicates a potential jamming event and false indicates normal service.

14. A method according to claim 13, wherein the multiple features include two or more of the following:
   signal-to-noise ratio for every present satellite;
   phase for every present satellite;
   number of visible satellites;
   mean signal-to-noise ratio of all visible satellites;
      windowed mean for five, ten and twenty second windows;
   windowed median for five, ten and twenty second windows;
   windowed mode for five, ten and twenty second windows;
   average power from GNSS jamming detector;
   peak power from GNSS jamming detector;

windowed mean power for thirty second window; and differential of windowed mean power for thirty second window.

15. A method according to claim 10, wherein the identification is completed using a Box-Cox transformation, comprising:

(a) processing the synchronized data using a Box-Cox transform to obtain a normalized distribution;

(b) comparing the normalized distribution with one or more user-definable thresholds to classify whether the normalized data indicates a potential jamming event;

(c) repeating steps (a) and (b) above for different consecutive times to obtain a plurality of potential jamming events; and (d) clustering a particular number of consecutive potential jamming events to identify an actual GNSS jamming event.

16. A method according to claim 10, wherein the tagging of potential jamming events data is standardized between different GNSS receiver types (such as Trimble, Septentrio etc.) so that different GNSS receiver types can be directly compared despite producing raw data of a different format.

17. A system for detecting and classifying GNSS jamming events comprising:

a GNSS receiver including a GNSS signal antenna; and a computer system comprising a processor with associated software programs that when executed causes the system to perform the following:

(a) receive spectral intensity data recorded by a GNSS receiver at a particular time;

(b) process the spectral intensity data using a Box-Cox transform to obtain a normalized spectral intensity distribution;

(c) compare the normalized spectral intensity distribution with one or more user-definable thresholds to classify whether the normalized spectral intensity data indicates a potential jamming event, wherein the user tunable threshold comprises: (a) a standard deviation threshold, above which a single sample frequency is determined to be anomalous; and (b) an anomaly count, which determines how many sample frequencies is enough to consider the whole spectrum as a potential jamming event;

(d) repeat steps (a) to (c) above for different consecutive times to obtain a plurality of potential jamming events;

(e) cluster a particular number of consecutive potential jamming events to identify an actual GNSS jamming event;

(f) tag the identified parts of the GNSS signal data to indicate that it is subject to jamming; and (g) output the tagged GNSS signal data.

18. A system for detecting and classifying GNSS jamming events comprising:

a GNSS receiver including a GNSS signal antenna;

an off-the-shelf GNSS jamming detector; and a computer system comprising a processor with associated software programs that when executed causes the system to perform the following:

(a) receive GNSS signal data recorded by a GNSS receiver whilst taking a position fix;

(b) receive jamming data indicative of jamming of a GNSS signal during the position fix, the jamming data being generated by a GNSS jamming detector separate from the GNSS receiver;

(c) synchronize the jamming data and the GNSS signal data, wherein synchronizing the jamming data and the GNSS signal data comprises, converting the raw data, which is recorded at discrete time stamps but with different sample frequencies, by interpolating the two data sets together by sampling them both using the same sample intervals;

(d) identify parts of the GNSS signal data which are subject to jamming based on the jamming data;

(e) group a particular number of GNSS signal data parts which are subject to jamming;

(f) tag the identified parts of the GNSS signal data to indicate that it is subject to jamming; and (g) output the tagged GNSS signal data.

\* \* \* \* \*